United States Patent
Sasaki et al.

(10) Patent No.: US 11,098,225 B2
(45) Date of Patent: Aug. 24, 2021

(54) ADHESIVE COMPOSITION

(71) Applicant: DENKA COMPANY LIMITED, Tokyo (JP)

(72) Inventors: Makiko Sasaki, Shibukawa (JP); Takako Hoshino, Tokyo (JP); Gosuke Nakajima, Shibukawa (JP)

(73) Assignee: DENKA COMPANY LIMITED, Tokyo (JP)

( * ) Notice: Subject to any disclaimer, the term of this patent is extended or adjusted under 35 U.S.C. 154(b) by 237 days.

(21) Appl. No.: 16/319,115

(22) PCT Filed: Jul. 19, 2017

(86) PCT No.: PCT/JP2017/026134
§ 371 (c)(1),
(2) Date: Jan. 18, 2019

(87) PCT Pub. No.: WO2018/016535
PCT Pub. Date: Jan. 25, 2018

(65) Prior Publication Data
US 2019/0276715 A1    Sep. 12, 2019

(30) Foreign Application Priority Data

Jul. 19, 2016 (JP) .................. 2016-141783

(51) Int. Cl.
| | |
|---|---|
| C09J 4/00 | (2006.01) |
| B32B 7/12 | (2006.01) |
| B32B 27/20 | (2006.01) |
| B32B 27/34 | (2006.01) |
| B32B 27/30 | (2006.01) |
| C09J 4/06 | (2006.01) |

(52) U.S. Cl.
CPC ................... *C09J 4/00* (2013.01); *B32B 7/12* (2013.01); *B32B 27/20* (2013.01); *B32B 27/30* (2013.01); *B32B 27/34* (2013.01); *C09J 4/06* (2013.01)

(58) Field of Classification Search
USPC ........................................... 526/277
See application file for complete search history.

(56) References Cited

U.S. PATENT DOCUMENTS

| | | | |
|---|---|---|---|
| 5,459,206 A | 10/1995 | Somemiya et al. | 525/479 |
| 5,863,989 A | 1/1999 | Taguchi et al. | 525/245 |
| 6,086,795 A | 7/2000 | Hatton | 252/582 |

FOREIGN PATENT DOCUMENTS

| | | |
|---|---|---|
| CN | 1167801 A | 12/1997 |
| EP | 0 802 249 A1 | 10/1997 |
| JP | S 59-221371 A | 12/1984 |
| JP | S 59-221372 A | 12/1984 |
| JP | 5-331447 A | 12/1993 |
| JP | H 11-256120 A | 9/1999 |
| JP | 2001-55423 A | 2/2001 |
| JP | 2001-342216 A | 12/2001 |
| JP | 2002-88107 A | 3/2002 |
| JP | 2002-88108 A | 3/2002 |
| JP | 2005-126591 A | 5/2005 |
| JP | 2012-7066 A | 1/2012 |
| WO | WO 2015/186803 A1 | 12/2015 |
| WO | WO 2017/018371 A1 | 2/2017 |
| WO | WO 2017/170955 A1 | 10/2017 |

OTHER PUBLICATIONS

Machine translation of JP 2001-055423. (Year: 2001).*
Extended European Search Report dated May 27, 2019, to European Application No. 17831051.2.
Notification of Transmittal of Translation of the International Preliminary Report on Patentability dated Jan. 31, 2019, issued by the International Bureau of WIPO in corresponding application PCT/JP2017/026134.
Chinese Office Action dated Nov. 27, 2020, issued by the China National Intellectual Property Administration in corresponding application CN 201780044626.4.

* cited by examiner

*Primary Examiner* — Fred M Teskin
(74) *Attorney, Agent, or Firm* — Stein IP LLC

(57) ABSTRACT

Provided is an adhesive composition having high adhesiveness to polyamides. An adhesive composition for bonding adherends comprising a polyamide, comprising the following components (1) to (4): (meth)acrylates (1), excluding the component (2), comprising the following ingredients (1-1), (1-2), and (1-3): a (meth)acrylate (1-1), excluding an ingredient (1-3), having an aromatic group; a (meth)acrylate (1-2) having a hydroxy group; and a (meth)acrylate (1-3) represented by general formula (A); an acidic phosphate compound (2); a polymerization initiator (3); and a reducing agent (4) comprising a transition metal salt.

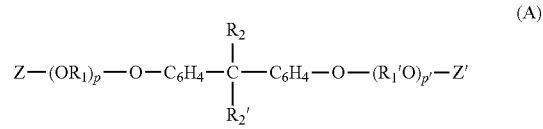

(A)

10 Claims, No Drawings

ADHESIVE COMPOSITION

CROSS-REFERENCE TO RELATED APPLICATIONS

This application is a national stage of International Application No. PCT/JP2017/026134, filed Jul. 19, 2017, which claims the benefit of priority to Japanese Application No. 2016-141783, filed Jul. 19, 2016, in the Japanese Patent Office, the disclosures of which are incorporated herein in their entireties by reference.

TECHNICAL FIELD

The present invention relates to an adhesive composition.

BACKGROUND ART

Means for joining resin members includes mechanical fastening with bolts and nuts and welding. In the case of mechanical fastening, the fasteners cause a great increase in the mass of the laminate, and the stress is heavily concentrated on the junction, which may be a fracture origin. On the other hand, welding does not cause any increase in the mass and is effective for thermoplastic resins such as polyamides. However, it is difficult to perform welding over a large area, and the size of the resulting laminate is therefore limited. In addition, if materials with different electric potentials, such as a metal and a resin reinforced with an electric conductor, for example, carbon fiber, and joined by mechanical fastening or welding, the resulting laminate may be easily corroded (electrolytic corrosion).

An adhesive composition used for bonding can be easily applied over a large area. Bonding with an adhesive composition is expected to prevent electrolytic corrosion because an adhesive layer is interposed between different types of materials to be joined to prevent contact between the adherends.

However, resin is more difficult to bond than metal, and it has been difficult to obtain a laminate including resin in which adherends are strongly bonded. There is a technique of melting adherend resin to bond the adherends, but the process is complicated because the technique requires a solvent for dissolving the resin, heating, pressurization, or the like.

Patent Literatures 1 to 5 disclose adhesive compositions for bonding polyamides. However, Patent Literatures 1 and 2 do not refer to acidic phosphate compounds, and Patent Literature 3 does not refer to (meth)acrylates. In Patent Literatures 4 and 5, imidazoles and tertiary amines are used as reducing agents, and they have had problems with the hardenability and adhesive strength.

CITATION LIST

Patent Literature

Patent Literature 1: Japanese Patent Laid-Open No. 2005-126591
Patent Literature 2: Japanese Patent Laid-Open No. H11-256120
Patent Literature 3: Japanese Patent Laid-Open No. 2012-007066
Patent Literature 4: Japanese Patent Laid-Open No. S59-221372
Patent Literature 5: Japanese Patent Laid-Open No. S59-221371

SUMMARY OF INVENTION

Technical Problem

An object of the present invention is to provide an adhesive composition for bonding a polyamide.

Solution to Problem

The present invention can provide the following aspects.
<1> An adhesive composition for bonding adherends containing a polyamide, the composition comprising the following components (1) to (4):
(meth)acrylates (1), excluding the component (2), including the following ingredients (1-1), (1-2), and (1-3):
a (meth)acrylate (1-1), which is not the ingredient (1-3), having an aromatic group,
a (meth)acrylate (1-2) having a hydroxy group, and
a (meth)acrylate (1-3) represented by general formula (A);

[Formula 1]

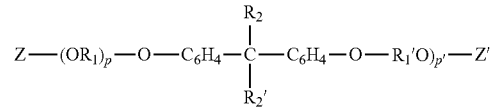

Formula (A)

(wherein Z and Z' each represent a (meth)acryloyl group, and Z and Z' are the same or different; $R_1$ and $R_1'$ each represent an alkylene group, and $R_1$ and $R_1'$ are the same or different; $R_2$ and $R_2'$ each represent hydrogen or an alkyl group with 1 to 4 carbon atoms, and $R_2$ and $R_2'$ are the same or different; and p and p' each represent an integer from 0 to 8, and p and p' are the same or different).
an acidic phosphate compound (2);
a polymerization initiator (3); and
a reducing agent (4) containing a transition metal salt.
<2> The adhesive composition according to aspect <1>, in which the acidic phosphate compound (2) is an acidic phosphate compound represented by general formula (C).

[Formula 2]

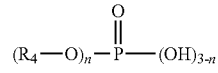

Formula (C)

(wherein $R_4$ represents a $CH_2$=$CR_5CO(OR_6)_m$— group (where $R_5$ represents hydrogen or a methyl group, $R_6$ represents —$C_2H_4$—, —$CH_2CH(CH_3)$—, —$C_4H_8$—, —$C_6H_{12}$—, or

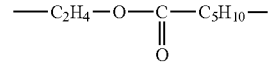

and m represents an integer from 1 to 10), and n represents an integer of 1 or 2.)

<3> The adhesive composition according to aspect <1> or <2>, in which the polymerization initiator (3) is a thermal radical polymerization initiator.

<4> The adhesive composition according to one of aspects <1> to <3>, in which the reducing agent (4) is vanadyl acetylacetonate.

<5> The adhesive composition according to one of aspects <1> to <4>, further containing an elastomer (5).

<6> The adhesive composition according to one of aspects <1> to <5>, in which the polyamide is at least one selected from the group consisting of nylon 6 and nylon 6,6.

<7> The adhesive composition according to one of aspects <1> to <6>, in which the polyamide contains a filling material.

<8> The adhesive composition according to aspect <7>, in which the filling material is an inorganic fiber.

<9> A two-part adhesive composition, wherein the adhesive composition according to one of aspects <1> to <8> is separated into a first part containing at least the polymerization initiator (3) and a second part containing at least the reducing agent (4).

<10> A laminate having adherends at least one of which is a polyamide sheet or plate, and an adhesive layer formed of the adhesive composition according to one of aspects <1> to <9>.

Advantageous Effect of Invention

The present invention can provide an adhesive composition having high adhesiveness to polyamides.

DESCRIPTION OF EMBODIMENT

The following describes the present embodiment in detail. In the present specification, a range of values includes its upper and lower limits unless otherwise stated.

(Meth)acrylates (1) may, for example, be monomers having (meth)acryloyl groups. An adhesive composition according to the present embodiment may be either a one-part or two-part adhesive. In the case of a two-part adhesive, the amounts of components used are based on the total of the first and second parts unless otherwise indicated.

The (meth)acrylates (1) may preferably include a (meth)acrylate (1-1) having an aromatic group; a (meth)acrylate (1-2) having a hydroxy group; and a (meth)acrylate (1-3) represented by general formula (A). The component (1) does not include a component (2) described later.

For example, the (meth)acrylate (1-1) having an aromatic group may make the adhesive composition stiff and improves the solubility of the elastomer component. It is preferable that the ingredient (1-1) do not include the ingredient (1-3) described later.

Examples of the monomer may include a (meth)acrylate represented by formula (B), phenoxyethyl (meth)acrylate, and 2-hydroxy-3-phenoxypropyl (meth)acrylate. Among these substances, the (meth)acrylate represented by formula (B) is preferable.

[Formula 3]

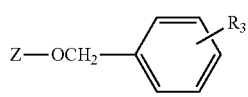

Formula (B)

(wherein Z represents a (meth)acryloyl group, and $R_3$ represents a hydrogen atom, a halogen atom, an alkyl group with 1 to 12 carbon atoms, or an alkoxy group with 1 to 12 carbon atoms.)

Examples of the (meth)acrylate represented by formula (B) may include benzyl (meth)acrylate, methylbenzyl (meth)acrylate, ethylbenzyl (meth)acrylate, propylbenzyl (meth)acrylate, methoxybenzyl (meth)acrylate, and chlorobenzyl (meth)acrylate. Among the (meth)acrylates represented by formula (B), benzyl (meth)acrylate is preferable.

The amount of the ingredient (1-1) may preferably be 10 to 85 parts by mass, more preferably 20 to 70 parts by mass, most preferably 35 to 65 parts by mass, in a total of 100 parts by mass of the component (1). If the amount is 10 parts by mass or more, the solubility of the elastomer component is improved, so that the workability and spreadability are improved. If the amount is 85 parts by mass or less, the peel strength is enhanced.

For example, the (meth)acrylate (1-2) having a hydroxy group may improve the adhesiveness to the adherend.

Examples of the monomer may include hydroxyalkyl (meth)acrylates, polyethylene glycol (meth)acrylate, phenoxy diethylene glycol (meth)acrylate, tripropylene glycol di(meth)acrylate, and 1,6-hexanediol di(meth)acrylate. Among these substances, hydroxyalkyl (meth)acrylates are preferable.

Among hydroxyalkyl (meth)acrylates, a (meth)acrylate represented by formula (D) is preferable.

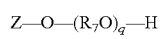
Formula (D):

(In formula (D), Z represents a (meth)acryloyl group, $R_7$ represents an alkylene group, and q represents an integer from 1 to 10.)

The alkylene group may preferably be an alkylene group with two to six carbon atoms. q is an integer, preferably 1.

Examples of the (meth)acrylate represented by formula (D) may include 2-hydroxyethyl (meth)acrylate, 2-hydroxypropyl (meth)acrylate, and 2-hydroxybutyl (meth)acrylate. Among these substances, 2-hydroxybutyl (meth)acrylate is more preferable.

The amount of the ingredient (1-2) may preferably be 5 to 60 parts by mass, more preferably 10 to 50 parts by mass, most preferably 15 to 40 parts by mass, in a total of 100 parts by mass of the component (1). If the amount is 5 parts by mass or more, the adhesiveness is improved. If the amount is 60 parts by mass or less, the solubility of the elastomer component is improved, so that the workability, spreadability, and heat resistance are improved.

The (meth)acrylate (1-3) represented by general formula (A) has the following structure.

[Formula 4]

Formula (A)

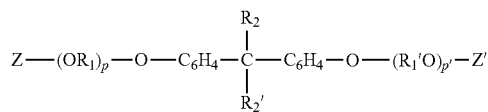

(wherein Z and Z' each represent a (meth)acryloyl group, and Z and Z' are the same or different; $R_1$ and $R_1'$ each represent an alkylene group, and $R_1$ and $R_1'$ are the same or different; $R_2$ and $R_2'$ each represent hydrogen or an alkyl group with 1 to 4 carbon atoms, and $R_2$ and $R_2'$ are the same or different; and p and p' each represent an integer from 0 to 8, and p and p' are the same or different).

$R_1$ and $R_1'$ are each preferably an alkylene group with two to six carbon atoms, more preferably an ethylene group, which has two carbon atoms. $R_2$ and $R_2'$ are each preferably a methyl group. p and p' are each an integer, preferably 0 to 8, more preferably 1 to 8, more preferably 3 to 8, most preferably 5.

Examples of the monomer may include 2,2-bis(4-(meth) acryloxyphenyl)propane, 2,2-bis(4-(meth)acryloxyethoxyphenyl)propane, 2,2-bis(4-(meth)acryloxydiethoxyphenyl) propane, 2,2-bis(4-(meth)acryloxypropoxyphenyl)propane, 2,2-bis(4-(meth)acryloxytetraethoxyphenyl)propane, and 2,2-bis(4-(meth)acryloxypolyethoxyphenyl)propane. Among these substances, 2,2-bis(4-(meth)acryloxypolyethoxyphenyl)propane is preferable.

The amount of the ingredient (1-3) may preferably be 1 to 60 parts by mass, more preferably 10 to 45 parts by mass, most preferably 15 to 30 parts by mass, in a total of 100 parts by mass of the component (1). If the amount is 1 part by mass or more, the heat resistance is improved. If the amount is 60 parts by mass or less, the solubility of the elastomer component is improved, so that the workability and spreadability are improved.

An acidic phosphate compound (2) is preferably an acidic phosphate compound represented by general formula (C). For example, the acidic phosphate compound may improve the adhesiveness to the adherend.

[Formula 5]

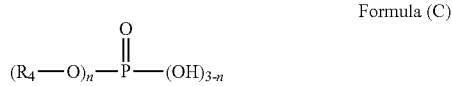

Formula (C)

(wherein $R_4$ represents a $CH_2=CR_5CO(OR_6)_m-$ group (where $R_5$ represents hydrogen or a methyl group, $R_6$ represents $-C_2H_4-$, $-C_3H_6-$, $-CH_2CH(CH_3)-$, $-C_4H_8-$, $-C_6H_{12}-$, or

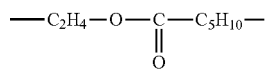

and m represents an integer from 1 to 10), and n represents an integer of 1 or 2.)

Examples of the component (2) may include acid phosphoxyethyl (meth)acrylate, acid phosphoxypropyl (meth) acrylate, and bis(2-(meth)acryloyloxyethyl)phosphate. Among these substances, acid phosphoxyethyl (meth)acrylate is preferable. The component (2) is preferably contained in the second part.

The amount of the component (2) may preferably be 0.05 to 20 parts by mass, more preferably 0.5 to 10 parts by mass, most preferably 1 to 6 parts by mass, with respect to the total of 100 parts by mass of the component (1). If the amount is 0.05 parts by mass or more, the hardening speed is high, and the adhesiveness is improved. If the amount is 20 parts by mass or less, good compatibility is obtained, and the adhesiveness is improved.

A polymerization initiator (3) may preferably be a thermal radical polymerization initiator. The thermal radical polymerization initiator may preferably be an organic peroxide. Examples of the organic peroxide may include cumene hydroperoxide, p-menthane hydroperoxide, t-butyl hydroperoxide, diisopropylbenzene dihydroperoxide, methyl ethyl ketone peroxide, benzoyl peroxide, and t-butyl peroxybenzoate. Among these substances, cumene hydroperoxide is preferable in view of the stability.

The amount of the polymerization initiator (3) may preferably be 0.1 to 20 parts by mass, more preferably 0.5 to 10 parts by mass, most preferably 0.8 to 5 parts by mass, with respect to the total of 100 parts by mass of the component (1). If the amount is 0.1 parts by mass or more, the hardening speed is enhanced. If the amount is 20 parts by mass or less, the storage stability is improved.

A reducing agent that reacts with the polymerization initiator to generate a radical may be used as a reducing agent (4) containing a transition metal salt.

Examples of the transition metal salt (4) may include cobalt naphthenate, copper naphthenate, and vanadyl acetylacetonate. Among the transition metal salts, vanadyl acetylacetonate is preferable.

The amount of the reducing agent (4) containing a transition metal salt may preferably be 0.05 to 15 parts by mass, more preferably 0.1 to 5 parts by mass, with respect to the total of 100 parts by mass of the component (1). If the amount is 0.05 parts by mass or more, the hardening speed is enhanced. If the amount is 15 parts by mass or less, the storage stability is improved.

In the present embodiment, it is preferable to use an elastomer (5) to enhance the peel strength and impact strength.

The elastomer used in the present embodiment may preferably be a macromolecular substance that has rubber-like elasticity at ordinary temperatures and can be dissolved or dispersed in a polymerizable vinyl monomer. The ordinary temperatures are temperatures defined by JIS Z 8703: 1983; that is, 20±15° C.

Examples of the elastomer may include copolymers such as (meth)acrylonitrile-butadiene-(meth)acrylic acid copolymers, (meth)acrylonitrile-butadiene-methyl (meth)acrylate copolymers, and methyl (meth)acrylate-butadiene-styrene copolymers (MBS); various synthetic rubbers such as (meth) acrylonitrile-butadiene rubbers (NBR), linear polyurethanes, and styrene-butadiene; natural rubbers; and various thermoplastic elastomers. One or more of these elastomers may be used unless the use causes a problem in compatibility.

Among these substances, at least one selected from the group consisting of methyl (meth)acrylate-butadiene-styrene copolymers and (meth)acrylonitrile-butadiene rubbers is preferable because the solubility in a polymerizable vinyl monomer and the adhesiveness are good. It is more preferable to use a methyl (meth)acrylate-butadiene-styrene copolymer and a (meth)acrylonitrile-butadiene rubber in combination. In the case where a methyl (meth)acrylate-butadiene-styrene copolymer and a (meth)acrylonitrile-butadiene rubber are used in combination, the ratio between their contents is preferably such that the methyl (meth)acrylate-butadiene-styrene copolymer: the (meth)acrylonitrile-butadiene rubber=10-90:90-10, more preferably 40-60:60-40, in terms of the mass ratio in a total of 100 parts by mass of the methyl (meth)acrylate-butadiene-styrene copolymer and the (meth)acrylonitrile-butadiene rubber.

The amount of the elastomer may preferably be 10 to 50 parts by mass, more preferably 20 to 40 parts by mass, with respect to the total of 100 parts by mass of the component (1).

The present embodiment provides an adhesive composition for bonding adherends containing a polyamide. In the present embodiment, at least one of two adherend sheets or plates is preferably an adherend sheet or plate containing a polyamide as the matrix resin.

The polyamide that serves as the matrix resin of the adherend is preferably a linear polymer including an amido group (—NHCO—) in the repeating unit of the molecular structure. Examples of the polyamide may include polyamides with aliphatic skeletons, polyamides with aromatic skeletons, and polyamides with alicyclic skeletons. Among these substances, polyamides (nylons) with aliphatic skeletons are preferable. Polyamides may be used for, for example, auto parts because polyamides have good mechanical properties such as high strength and tenacity. Polyamides are, for example, thermoplastic. A polyamide may be obtained by, for example, polycondensation of a lactam or an amino acid or polycondensation of a diamine and a dicarboxylic acid. The polyamide may be a homopolymer, a copolyamide resin of two or more types of monomers, or a blend. Examples of nylons include nylon 6 (which has the structure —(—$(CH_2)_5$—CONH—$)_n$—), nylon 6,6 (which has the structure —(—$(CH_2)_4$—CONH—$(CH_2)_6$—NH—$)_n$—), and nylon 12 (which has the structure —(—$(CH_2)_{11}$—CONH—$)_n$—). Among nylons, at least one selected from nylon 6 and nylon 6,6 is preferable in view of formability and availability.

The polyamide used in the present embodiment may contain a filling material such as organic fibers, inorganic fibers, and fillers to provide effective reinforcement.

Examples of the organic fibers may include aramid fibers and polyester fibers. Examples of the inorganic fibers may include glass fiber, carbon fiber, and mineral fibers. Examples of the fillers may include talc and calcium carbonate. Among the filling materials, inorganic fibers are preferable. Among the inorganic fibers, carbon fiber is preferable.

The fiber in the polyamide may be either continuous fiber or discontinuous fiber. In the case of continuous fiber, for example, the fiber may be one of a woven fabric, a knitted fabric, a fabric in which filaments are oriented in one direction, a nonwoven fabric, and a laminate of these fabrics.

The content of the filling material may preferably be 5 to 50 parts by mass, more preferably 10 to 40 parts by mass, in 100 parts by mass of the polyamide.

The product provided by the present embodiment is used as an adhesive composition. The product of the present embodiment is preferably used as a two-part adhesive composition. In the case of a two-part adhesive, the essential components of the adhesive composition according to the present embodiment are not mixed during storage, in other words, the adhesive composition is separated into a first part containing at least the polymerization initiator and a second part containing at least the reducing agent and stored separately. The two-part adhesive is preferable because good storage stability is obtained. In this case, the composition can be used as a two-part adhesive composition by applying both parts at the same time or separately to contact them and harden the composition.

Examples of an adherend containing no polyamide, that can constitute the laminate according to the present embodiment, may include paper, wood, ceramics, glass, pottery, rubber, plastics, mortar, concrete, and metal.

EXAMPLES

The following describes the present embodiment in more detail referring to examples. The amount of each substance used is indicated in parts by mass.

Commercial products were used as the substances. Special remarks are as follows.

NBR: acrylonitrile-butadiene copolymer
MBS: methyl methacrylate-butadiene-styrene copolymer
2,2-Bis(4-methacryloxypolyethoxyphenyl)propane: A compound represented by formula (A) where p and p'=5 was used.

Acidic phosphate compound: a phosphate ester, specifically an acid phosphoxyethyl methacrylate (represented by the following structural formula):

$(CH_2$=$C(CH_3)$—$COOC_2H_4O)_nP(O)(OH)_{3-n}$, where n is 1 or 2.

Physical properties were measured as follows.

[Preparation of Adhesive Composition]

Components of the amounts shown in Table 1 were mixed and stirred to provide adhesive compositions. Compositions containing cumene hydroperoxide (3) were regarded as first parts, and compositions containing vanadyl acetylacetonate (4) were regarded as second parts. Equal parts of each first part and the corresponding second part were mixed and stirred to provide an adhesive composition.

[Tensile Shear Strength (Tensile Shear Adhesive Strength)]

Plates of a carbon-fiber-reinforced thermoplastic resin (CFRTP (PA6)) containing nylon 6 as the matrix resin and plates of an aluminum alloy ($A5052-H_{34}$) were used as test pieces. Each test piece measured 100×25×2.0 mm and was used after being wiped with a waste rag. The adhesive composition prepared by mixing the first part and the second part was applied on one side of a test piece, and test pieces were immediately bonded together according to JIS K-6850 at a temperature of 23° C. and a humidity of 50%. The thickness of the adhesive layer was adjusted to 0.1 mm or 3 mm. Subsequently, the product was aged at room temperature for 24 hours. The resulting product was used as a test sample for measurement of tensile shear strength (in units of MPa) to determine the tensile shear strength.

After the measurement of the tensile shear strength, the state of the fracture was inspected. The state of the fracture is preferably cohesive failure or adherend failure near surface, more preferably cohesive failure, because the failure indicates strong adhesion between the adhesive layer and the adherend. The measurement was carried out at a temperature of 23° C. and a strain rate of 10 mm/min.

The following shows details of each test piece.

CFRTP (PA6): a carbon-fiber-reinforced thermoplastic resin containing nylon 6 as the matrix resin, Torayca TLP 1060 (which contains 30 mass % of long carbon fiber), manufactured by Toray Industries, Inc.

Aluminum alloy: $A5052-H_{34}$

Examples 1 to 4 and Comparative Examples 1 to 6

Laminates each including an adhesive layer of an adhesive composition, which had a composition for the corresponding example or comparative example shown in Table 1, between adherends were produced, and the tensile shear strength was measured. Laminates (CFRTP (PA6)/CFRTP (PA6)) each including an adhesive layer between carbon-fiber-reinforced thermoplastic resin plates and laminates (CFRTP (PA6)/aluminum alloy) each including an adhesive layer between a carbon-fiber-reinforced thermoplastic resin plate and an aluminum alloy plate were produced as the laminates.

TABLE 1

| | | | | Example 1 | Example 2 | Example 3 | Example 4 | Comparative Example 1 | Comparative Example 2 |
|---|---|---|---|---|---|---|---|---|---|
| First part | (1-1) | Benzyl methacrylate | | 60 | 60 | 60 | 60 | 60 | 60 |
| | (1-2) | 2-Hydroxybutyl methacrylate | | 20 | 20 | 20 | | 20 | 20 |
| | (1-2) | 2-Hydroxypropyl methacrylate | | | | | 20 | | |
| | (1-3) | 2,2-Bis(4-methacryloxypolyethoxyphenyl)propane | | 20 | 20 | 20 | 20 | 20 | 20 |
| | (3) | Cumene hydroperoxide | | 5 | 5 | 5 | 5 | 5 | 5 |
| | (5) | NBR | | 15 | 15 | 15 | 15 | 15 | 15 |
| | (5) | MBS | | 15 | 15 | 15 | 15 | 15 | 15 |
| Second part | (1-1) | Benzyl methacrylate | | 60 | 60 | 60 | 60 | 60 | 60 |
| | (1-2) | 2-Hydroxybutyl methacrylate | | 20 | 20 | 20 | | 20 | 20 |
| | (1-2) | 2-Hydroxypropyl methacrylate | | | | | 20 | | |
| | (1-3) | 2,2-Bis(4-methacryloxypolyethoxyphenyl)propane | | 20 | 20 | 20 | 20 | 20 | 20 |
| | (2) | Acid phosphoxyethyl methacrylate | | 0.5 | 5 | 20 | 0.5 | | 5 |
| | (4) | Vanadyl acetylacetonate | | 1 | 1 | 1 | 1 | 1 | |
| | | Mercaptobenzimidazole | | | | | | | 1 |
| | | Dimethylaniline | | | | | | | |
| | (5) | NBR | | 15 | 15 | 15 | 15 | 15 | 15 |
| | (5) | MBS | | 15 | 15 | 15 | 15 | 15 | 15 |
| Evaluation | Tensile shear adhesive strength [MPa] | CFRTP(PA6)/ CFRTP(PA6) | Thickness of adhesive 0.1 mm | 13.5 Cohesive failure | 16.5 Cohesive failure | 17.1 Cohesive failure | 13.0 Cohesive failure | 12.1 Cohesive failure | Unmeasurable because of insufficient curing of composition |
| | | | Thickness of adhesive 3 mm | 5.2 Interfacial failure | 73 Cohesive failure | 8.2 Cohesive failure | 4.4 Cohesive failure | 3.1 Cohesive failure | |
| | | CFRTP(PA6)/ Aluminum alloy | Thickness of adhesive 0.1 mm | 13.4 Cohesive failure | 16.8 Cohesive failure | 17.3 Adherend failure near surface | 13.1 Cohesive failure | 11.8 Cohesive failure | |

| | | | | Comparative Example 3 | Comparative Example 4 | Comparative Example 5 | Comparative Example 6 |
|---|---|---|---|---|---|---|---|
| First part | (1-1) | Benzyl methacrylate | | 60 | | 75 | 75 |
| | (1-2) | 2-Hydroxybutyl methacrylate | | 20 | 50 | | 25 |
| | (1-2) | 2-Hydroxypropyl methacrylate | | | | | |
| | (1-3) | 2,2-Bis(4-methacryloxypolyethoxyphenyl)propane | | 20 | 50 | 25 | |
| | (3) | Cumene hydroperoxide | | 5 | 5 | 5 | 5 |
| | (5) | NBR | | 15 | 15 | 15 | 15 |
| | (5) | MBS | | 15 | 15 | 15 | 15 |
| Second part | (1-1) | Benzyl methacrylate | | 60 | | 75 | 75 |
| | (1-2) | 2-Hydroxybutyl methacrylate | | 20 | 50 | | 25 |
| | (1-2) | 2-Hydroxypropyl methacrylate | | | | | |
| | (1-3) | 2,2-Bis(4-methacryloxypolyethoxyphenyl)propane | | 20 | 50 | 25 | |
| | (2) | Acid phosphoxyethyl methacrylate | | 5 | 5 | 5 | 5 |
| | (4) | Vanadyl acetylacetonate | | | 1 | 1 | 1 |
| | | Mercaptobenzimidazole | | | | | |
| | | Dimethylaniline | | 1 | | | |
| | (5) | NBR | | 15 | 15 | 15 | 15 |
| | (5) | MBS | | 15 | 15 | 15 | 15 |
| Evaluation | Tensile shear adhesive strength [MPa] | CFRTP(PA6)/ CFRTP(PA6) | Thickness of adhesive 0.1 mm | 7.8 Cohesive failure | Unmeasurable because of insufficient dissolution of elastomer | 12.8 Cohesive failure | 12.2 Cohesive failure |
| | | | Thickness of adhesive 3 mm | 20 Cohesive failure | | 2.1 Interfacial failure | 2.3 Interfacial failure |
| | | CFRTP(PA6)/ Aluminum alloy | Thickness of adhesive 0.1 mm | 6.4 Interfacial failure | | 8.6 Interfacial failure | 12.6 Cohesive failure |

The amount used is indicated in parts by mass.

The present embodiment provided high adhesive strength because of the acidic phosphate compound. The adhesiveness of 2-hydroxybutyl methacrylate is higher than the adhesiveness of 2-hydroxypropyl methacrylate (see Example 1 and Example 4). The absence of the component (2) caused decrease in adhesiveness when the thickness of the adhesive was 3 mm and decrease in adhesiveness to the aluminum alloy (see Comparative Example 1). In the case where mercaptobenzimidazole was used as the reducing agent, the tensile shear strength could not be measured because of insufficient curing (see Comparative Example 2). Use of dimethylaniline as the reducing agent reduced the adhesive strength (see Comparative Example 3). The absence of the ingredient (1-1) prevented the elastomer component from being dissolved in the monomer component, and the tensile shear strength could not be measured (see Comparative Example 4). The absence of the ingredient (1-2) caused decrease in adhesiveness when the thickness of the adhesive was 3 mm and decrease in adhesiveness to the aluminum alloy (see Comparative Example 5). The absence of the ingredient (1-3) caused decrease in adhesiveness when the thickness of the adhesive was 3 mm (see Comparative Example 6).

INDUSTRIAL APPLICABILITY

The present embodiment can provide a laminate in which adherend sheets or plates are strongly bonded in the case where at least one of the adherends contains a polyamide as the matrix resin. The present embodiment provides the laminate in which adherends are strongly bonded even without use of a solvent, heating, or pressurization during the bonding process. The present embodiment provides a polyamide composite member in which adherends are firmly bonded and are not easily detached. The present embodiment also provides a large part having a low risk of electrolytic corrosion even in the case where the adherends are made of different types of materials.

When parts such as auto parts are to be bonded, there has been a case where a large gap is left between two adherend sheets or plates because it is difficult to make the gap between the adherends uniform. In the present embodiment, the adhesiveness is high even when the gap (thickness of the adhesive) between the adherends is as large as 3 mm. The present embodiment popularizes parts, such as auto parts, made of resin, which offers weight reduction. The present embodiment is therefore of high industrial value.

The invention claimed is:

1. An adhesive composition for bonding adherends comprising a polyamide, comprising the following components (1) to (4):
   (meth)acrylates (1), excluding the component (2), comprising the following ingredients (1-1), (1-2), and (1-3):
   a (meth)acrylate (1-1) represented by general formula (B), excluding an ingredient (1-3)

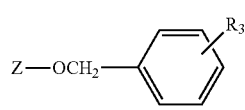

Formula (B)

wherein Z represents a (meth)acryloyl group, and $R_3$ represents a hydrogen atom, a halogen atom, an alkyl group with 1 to 12 carbon atoms, or an alkoxy group with 1 to 12 carbon atoms;
a (meth)acrylate (1-2) having a hydroxy group; and
a (meth)acrylate (1-3) represented by general formula (A);

[Formula 1]

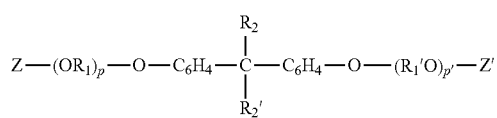

Formula (A)

(wherein Z and Z' each represent a (meth)acryloyl group, and Z and Z' are the same or different; R1 and R1' each represent an alkylene group, and R1 and R1' are the same or different; R2 and R2' each represent hydrogen or an alkyl group with 1 to 4 carbon atoms, and R2 and R2' are the same or different; and p and p" each represent an integer from 0 to 8, and p and p' are the same or different);
an acidic phosphate compound (2);
a polymerization initiator (3); and
a reducing agent (4) comprising a transition metal salt.

2. The adhesive composition according to claim 1, wherein the acidic phosphate compound (2) is an acidic phosphate compound represented by general formula (C):

[Formula 2]

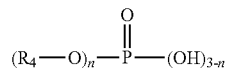

Formula (C)

(wherein $R_4$ represents a $CH_2=CR_5CO(OR_6)_m—$ group (where $R_5$ represents hydrogen or a methyl group, $R_6$ represents $—C_2H_4—$, $—C_3H_6—$, $—CH_2CH(CH_3)—$, $—C_4H_8—$, $—C_6H_{12}—$, or

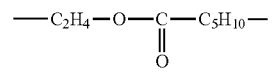

and m represents an integer from 1 to 10), and n represents an integer of 1 or 2).

3. The adhesive composition according to claim 1, wherein the polymerization initiator (3) is a thermal radical polymerization initiator.

4. The adhesive composition according to claim 1, wherein the reducing agent (4) is vanadyl acetylacetonate.

5. The adhesive composition according to claim 1, further comprising an elastomer (5).

6. The adhesive composition according to claim 1, wherein the polyamide is at least one selected from the group consisting of nylon 6 and nylon 6,6.

7. The adhesive composition according to claim 1, wherein the polyamide comprises a filling material.

8. The adhesive composition according to claim 7, wherein the filling material is an inorganic fiber.

9. A two-part adhesive composition, wherein the adhesive composition according to claim 1 is separated into:
   a first part comprising at least the polymerization initiator (3); and
   a second part comprising at least the reducing agent (4).

10. A laminate having adherends at least one of which is a polyamide sheet or plate and an adhesive layer formed of the adhesive composition according to claim 1 between the adherends.

* * * * *